(12) United States Patent
Ramanujam et al.

(10) Patent No.: US 6,366,256 B1
(45) Date of Patent: Apr. 2, 2002

(54) MULTI-BEAM REFLECTOR ANTENNA SYSTEM WITH A SIMPLE BEAMFORMING NETWORK

(75) Inventors: Parthasarathy Ramanujam, Redondo Beach; Philip H. Law, Encino; Steven O. Lane, Rolling Hills Estates, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/665,720

(22) Filed: Sep. 20, 2000

(51) Int. Cl.⁷ .............................................. H01Q 19/14
(52) U.S. Cl. ............................. 343/781 CA; 343/755; 343/779
(58) Field of Search ................................. 343/754, 755, 343/756, 757, 779, 753, 777, 781 CA, 781 R, 781 P, DIG. 2; H01Q 19/12, 19/14

(56) References Cited

U.S. PATENT DOCUMENTS

| | | | | |
|---|---|---|---|---|
| 3,795,003 A | * | 2/1974 | Meek et al. ................. | 343/754 |
| 4,516,128 A | * | 5/1985 | Watanabe et al. ........... | 343/761 |
| 4,562,441 A | * | 12/1985 | Beretta et al. ............. | 343/781 P |
| 4,628,321 A | * | 12/1986 | Martin ....................... | 343/779 |
| 5,420,597 A | * | 5/1995 | Duncan ...................... | 343/703 |
| 5,546,097 A | * | 8/1996 | Ramanujam et al. ... | 343/781 R |
| 5,751,254 A | * | 5/1998 | Bird et al. .................. | 343/761 |
| 6,061,033 A | * | 5/2000 | Hulderman et al. .. | 343/781 CA |
| 6,160,520 A | * | 12/2000 | Muhlhauser et al. ........ | 343/755 |

* cited by examiner

Primary Examiner—Tho Phan
(74) Attorney, Agent, or Firm—Gates & Cooper LLP

(57) ABSTRACT

An antenna system and method for generating a desired contiguous spot beam pattern, and a signal is disclosed. The contiguous spot beam generating antenna system comprises a reflector system configured in a side-fed Cassegrain (SFOC) configuration, an array of feed horns comprising at least a subset of feed horns for illuminating the reflector system, and a beamforming network, communicatively coupled to the array of feed horns, for controlling an excitation of the subset of the feed horns in the array of feed horns. The method comprises illuminating a side fed offset Cassegrain reflector system with an RF signal emanating from an array of feed horns, and controlling an excitation of the subset of the feed horns. The present invention provides a beamformer network that can produce uniform performance over wide scan angles, is easier to integrate and test, that can change the beam pattern on orbit, and that provides a more complete utilization of space assets without dramatically increasing the cost of manufacturing and operating a satellite. The use of a SFOC configuration or other wide scanning antenna permits the use of a simple beamforming network while maintaining excellent beam beam scanning characteristics.

21 Claims, 10 Drawing Sheets

|  | SFOC Configuration Feed Excitations | | | | Single Offset Configuration Feed Excitations | | | |
|---|---|---|---|---|---|---|---|---|
|  | Focal Beam | | Scanned Beam | | Focal Beam | | Scanned Beam | |
|  | Amp(w) | Phase(deg) | Amp(w) | Phase(deg) | Amp(w) | Phase(deg) | Amp(w) | Phase(deg) |
| Feed 1 | 0.82 | 0.0 | 0.82 | 0.0 | 0.791 | −2.0 | 0.640 | 18.6 |
| Feed 2 | 0.03 | 0.0 | 0.03 | 0.0 | 0.036 | 14.6 | 0.034 | 92.9 |
| Feed 3 | 0.03 | 0.0 | 0.03 | 0.0 | 0.028 | 3.0 | 0.046 | 33.9 |
| Feed 4 | 0.03 | 0.0 | 0.03 | 0.0 | 0.028 | 5.2 | 0.068 | −19.1 |
| Feed 5 | 0.03 | 0.0 | 0.03 | 0.0 | 0.035 | −5.6 | 0.077 | 16.1 |
| Feed 6 | 0.03 | 0.0 | 0.03 | 0.0 | 0.039 | −5.5 | 0.071 | −10.2 |
| Feed 7 | 0.03 | 0.0 | 0.03 | 0.0 | 0.041 | 3.5 | 0.063 | 12.9 |

FIG. 10

MULTI-BEAM REFLECTOR ANTENNA SYSTEM WITH A SIMPLE BEAMFORMING NETWORK

BACKGROUND OF THE INVENTION

1. Field of the Invention

This invention relates in general to antenna systems, and in particular to a multi-beam reflector antenna system with a simple beamforming network.

2. Description of Related Art

Communications satellites have become commonplace for use in many types of communications services, e.g., data transfer, voice communications, television spot beam coverage, and other data transfer applications. As such, satellites must provide signals to various geographic locations on the Earth's surface. As such, typical satellites use customized antenna designs to provide signal coverage for a particular country or geographic area.

The primary design constraints for communications satellites are antenna beam coverage and radiated Radio Frequency (RF) power. These two design constraints are typically thought of to be paramount in the satellite design because they determine which customers on the earth will be able to receive satellite communications service. Further, the satellite weight becomes a factor, because launch vehicles are limited as to how much weight can be placed into orbit.

Many satellites operate over fixed coverage regions and employ polarization techniques, e.g., horizontal and vertical polarized signals, to increase the number of signals that the satellite can transmit and receive. These polarization techniques use overlapping reflectors where the reflector surfaces are independently shaped to produce substantially congruent coverage regions for the polarized signals. This approach is limited because the coverage regions are fixed and cannot be changed on-orbit, and the cross-polarization isolation for wider coverage regions is limited to the point that many satellite signal transmission requirements cannot increase their coverage regions.

Many satellite systems would be more efficient if they contained antennas with high directivity of the antenna beam and had the ability to have the coverage region be electronically configured on-orbit to different desired beam patterns. These objectives are typically met using a phased array antenna system. However, phased array antennas carry with them the problems of large signal losses between the power amplifiers and the beam ports, because of the beamforming network interconnections and long transmission lines. Further, the beamforming network is heavy, difficult to integrate and test, and is difficult to repair or replace without large time and labor costs.

The need to change the beam pattern provided by the satellite has become more desirable with the advent of direct broadcast satellites that provide communications services to specific areas. As areas increase in population, or additional subscribers in a given area subscribe to the satellite communications services, e.g., DirecTV, satellite television stations, local channel programming, etc., the satellite must divert resources to deliver the services to the new subscribers. Without the ability to change beam patterns and coverage areas, additional satellites must be launched to provide the services to possible future subscribers, which increases the cost of delivering the services to existing customers. Further, such systems typically have beamforming networks that are heavy, complex, and difficult to design, test, and integrate onto a spacecraft, and can be difficult to design to produce a uniform performance over a wide scan angle for the antenna.

There is therefore a need in the art for a beamformer that can produce uniform performance over wide scan angles. There is also a need in the art for a beamformer that is easier to integrate and test. There is also a need in the art for a beamforming network that can change the beam pattern on orbit. There is also a need in the art for a beamformer that to provide more complete utilization of space assets without dramatically increasing the cost of manufacturing and operating a satellite.

SUMMARY OF THE INVENTION

To overcome the limitations in the prior art described above, and to overcome other limitations that will become apparent upon reading and understanding the present specification, the present invention discloses an antenna system and method for generating a desired contiguous spot beam pattern, and a signal. The contiguous spot beam generating antenna system comprises a reflector system configured in a side-fed Cassegrain (SFOC) configuration, an array of feed horns comprising at least a subset of feed horns for illuminating the reflector system, and a beamforming network, communicatively coupled to the array of feed horns, for controlling an excitation of the subset of the feed horns in the array of feed horns.

The method comprises illuminating a side fed offset Cassegrain reflector system with an RF signal emanating from an array of feed horns, and controlling an excitation of the subset of the feed horns. The present invention provides a beam former that can produce uniform performance over wide scan angles. The present invention also provides a beamformer that is easier to integrate and test. The present invention also provides a beamforming network that can change the beam pattern on orbit. The present invention also provides a beamformer that to provide more complete utilization of space assets without dramatically increasing the cost of manufacturing and operating a satellite.

BRIEF DESCRIPTION OF THE DRAWINGS

Referring now to the drawings in which like reference numbers represent corresponding parts throughout:

FIG. 10 illustrates the feed excitations required for the SFOC and single offset beamforming networks to generate the focal and scanned beams.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Satellite Environment

Figure 1A:
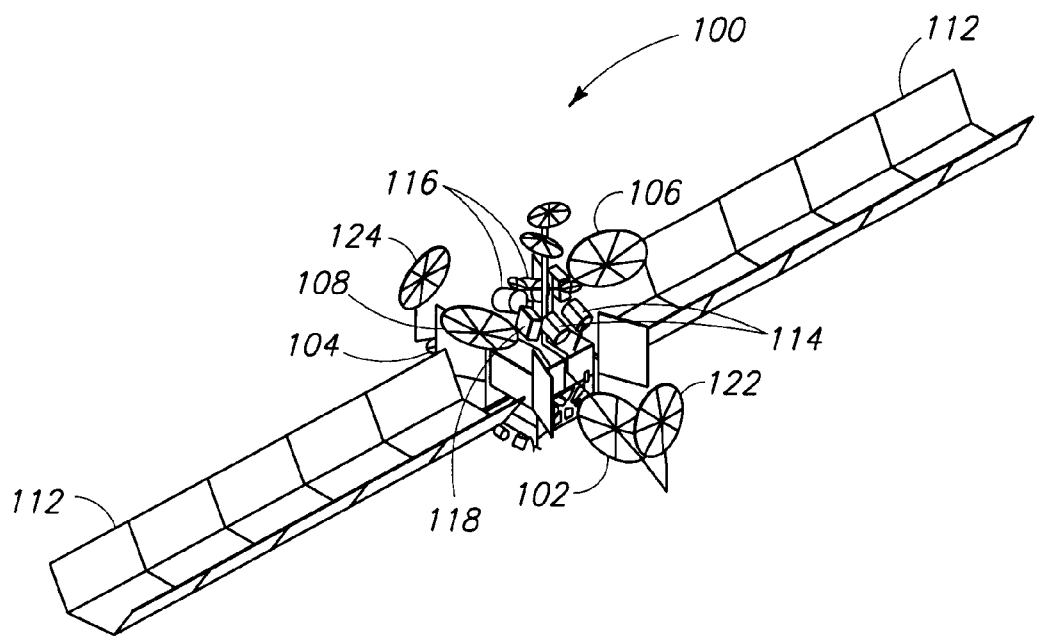
FIGS. 1A and 1B illustrate a typical satellite environment for the present invention.
Figure 1B:
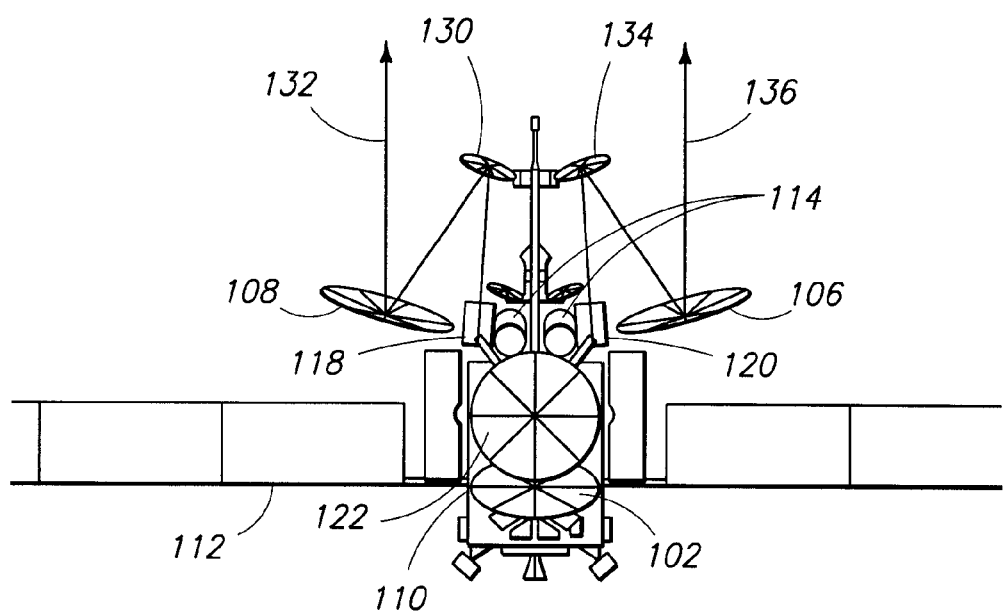

FIGS. 1A and 1B illustrate a typical satellite environment for the present invention.

Spacecraft 100 is illustrated with four antennas 102–108. Although shown as dual reflector antennas 102–108, antennas 102–108 can be direct fed single reflector antennas 102–108 without departing from the scope of the present invention. Antenna 102 is located on the east face of the spacecraft bus 110, antenna 104 is located on the west face of spacecraft bus 110, antenna 106 is located on the north part of the nadir face of the spacecraft bus 110, and antenna 108 is located on the south part of the nadir face of the spacecraft bus 110. Solar panels 112 are also shown for clarity.

Feed horns 114–120 are also shown. Feed horn 114 illuminates antenna 102, feed horn 116 illuminates antenna 104, feed horn 118 illuminates antenna 108, and feed horn 120 illuminates antenna 106. Feed horn 114 is directed towards subreflector 122, which is aligned with antenna 102. Feed horn 116 is directed towards subreflector 124, which is aligned with antenna 104. Feed horns 114–120 can be single or multiple sets of feed horns as desired by the spacecraft designer or as needed to produce the beams desired for geographic coverage. For example, feed horns 114 and 116 are shown as two banks of feed horns, but could be a single bank of feed horns, or multiple banks of feed horns, as desired. Antennae 102 and 104 are shown in a side-fed offset Cassegrain (SFOC) configuration, which are packaged on the East and West sides of the spacecraft bus 110. Antennas 106 and 108 are shown as offset Gregorian geometry antennas, but can be of other geometric design if desired. Further, antennas 102–108 can be of direct fed design, where the subreflectors are eliminated and the feed horns 114–120 directly illuminate reflectors 102–108 if desired. Further, any combination of Cassegrainian, Gregorian, SFOC, or direct illumination designs can be incorporated on spacecraft 100 without departing from the scope of the present invention.

Feed horn 118 illuminates subreflector 130 with RF energy, which is aligned with antenna 108 to produce output beam 132. Feed horn 120 illuminates subreflector 134 with RF energy, which is aligned with antenna 106 to produce beam 136. Beams 132 and 136 are used to produce coverage patterns on the Earth's surface. Beams 132 and 136 can cover the same geographic location, or different geographic locations, as desired. Further, feed horns 118 and 120 can illuminate the antennae 102–108 with more than one polarization of RF energy, i.e., left and right hand circular polarization, or horizontal and vertical polarization, simultaneously.

Although described with respect to satellite installations, the antennas described herein can be used in alternative embodiments, e.g., ground-based systems, mobile-based systems, etc., without departing from the scope of the present invention. Further, although the spacecraft 100 is described such that the feed horns 114–120 provide a transmitted signal from spacecraft 100 via the reflectors 102–108, the feed horns 114–120 can be diplexed such that signals can be received on the spacecraft 100 via reflectors 102–108.

Overview of the Related Art

Figure 2:
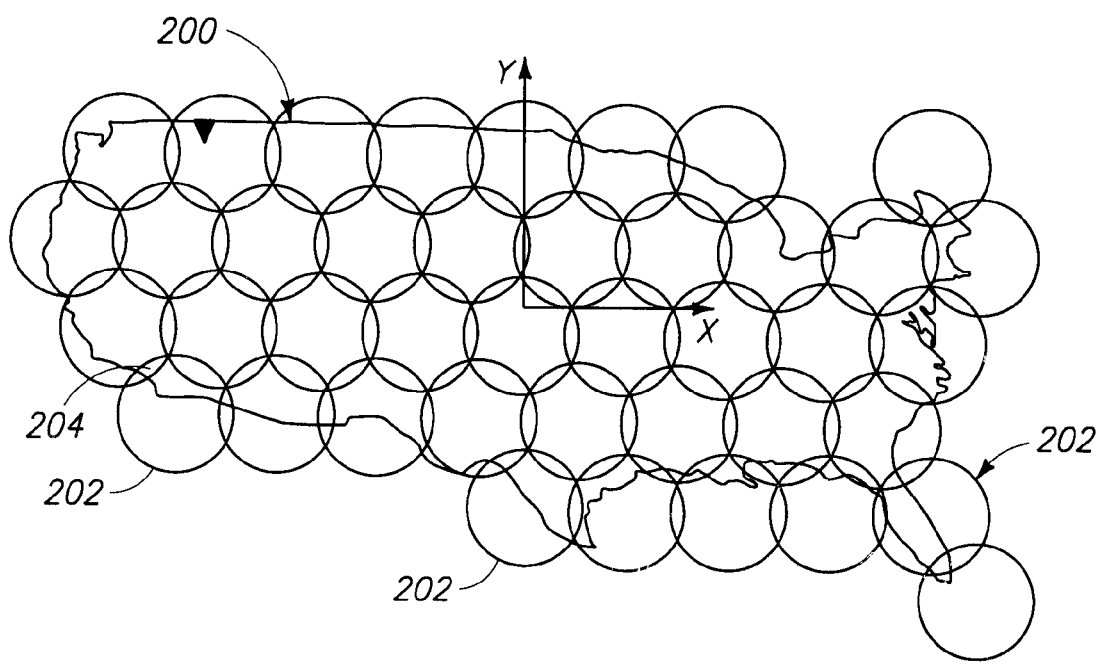
FIG. 2 illustrates a typical spot beam coverage of the Continental United States.

Current day satellites are required to generate contiguous spot beam coverages in order to provide continuous geographical coverage of a large geographic area. A typical Continental United States (CONUS) spot beam coverage pattern generated by a satellite is shown in FIG. 2. Outline 200 of the CONUS geographical area is shown as being overlapped by spot beams 202, which have intersection areas 204 to provide contiguous signal coverage over the CONUS outline 200.

Figure 3:
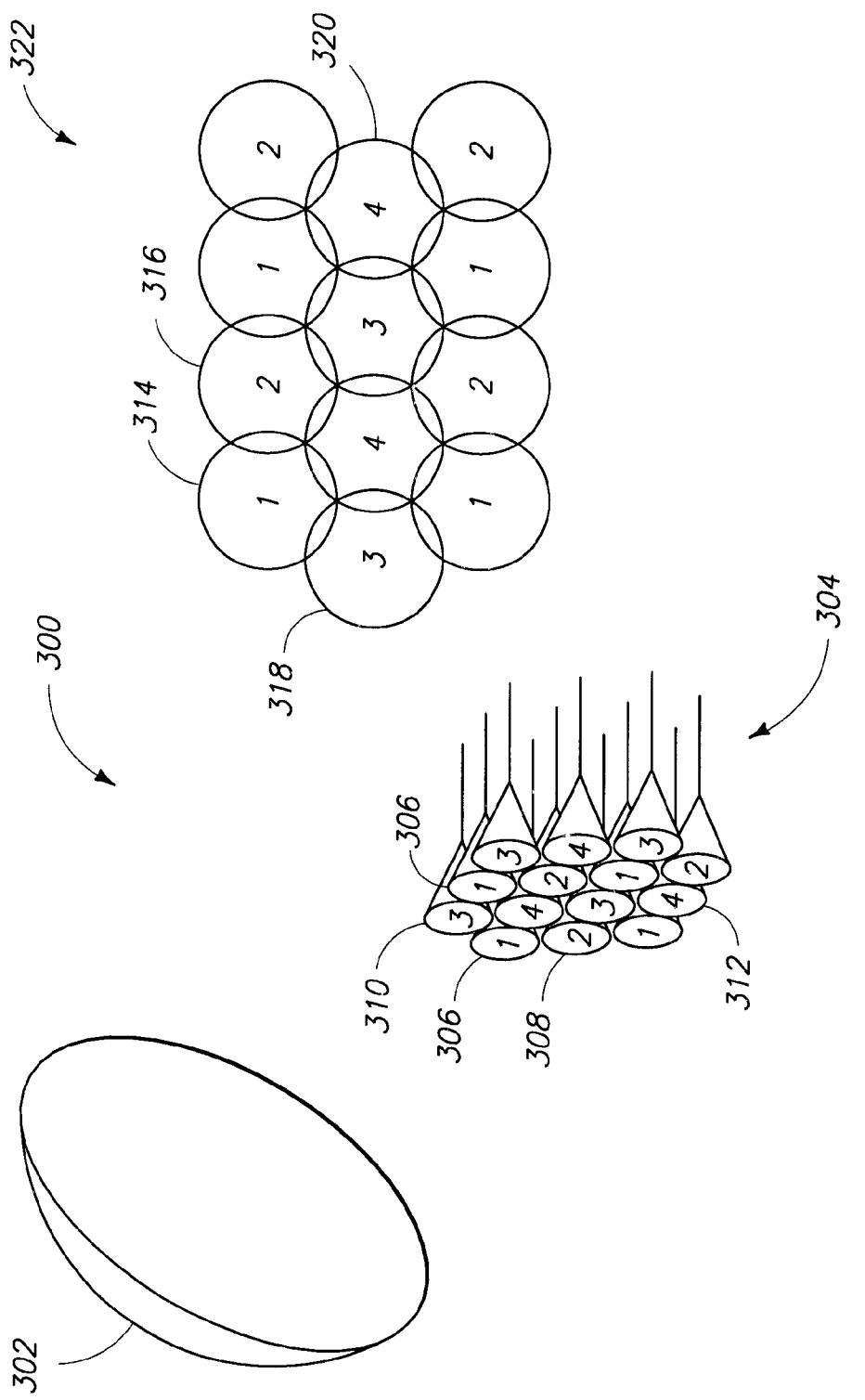
FIGS. 3–5 illustrate antenna systems that generate spot beam coverage pattern as shown in FIG. 2.

There are several antenna configurations that can be used to provide spot beam coverage as shown in FIG. 2. FIG. 3 illustrates one approach, which uses a single aperture antenna without a beamforming network.

System 300 comprises a single aperture antenna 302 and a bank of feed horns 304. The bank of feed horns 304 comprises signal 1 feed horns 306, signal 2 feed horns 308, signal 3 feedhorns 310, and signal 4 feed horns 312. These feed horns 306–312 each generate a separate spot beam 314–320, i.e., signal 1 feed horns 306 generate spot beam 1 314, signal 2 feed horns 308 generate spot beam 2 316, signal 3 feed horns 310 generate spot beam 3 318, and signal 4 feed horns 312 generate spot beam 4 320.

Due to the high overlap requirement, e.g., 3 to 6 dB, of the beams 314–320, the feed horn 306–312 size for system 300 is relatively small, which results in a very high spillover and associated degradation in performance for the system 300, e.g., 2 to 3 dB.

Further, there is no control of the beam pattern 322 shape, and, therefore, the scan performance of system 300 is limited by the reflector 302 geometry.

Figure 4:
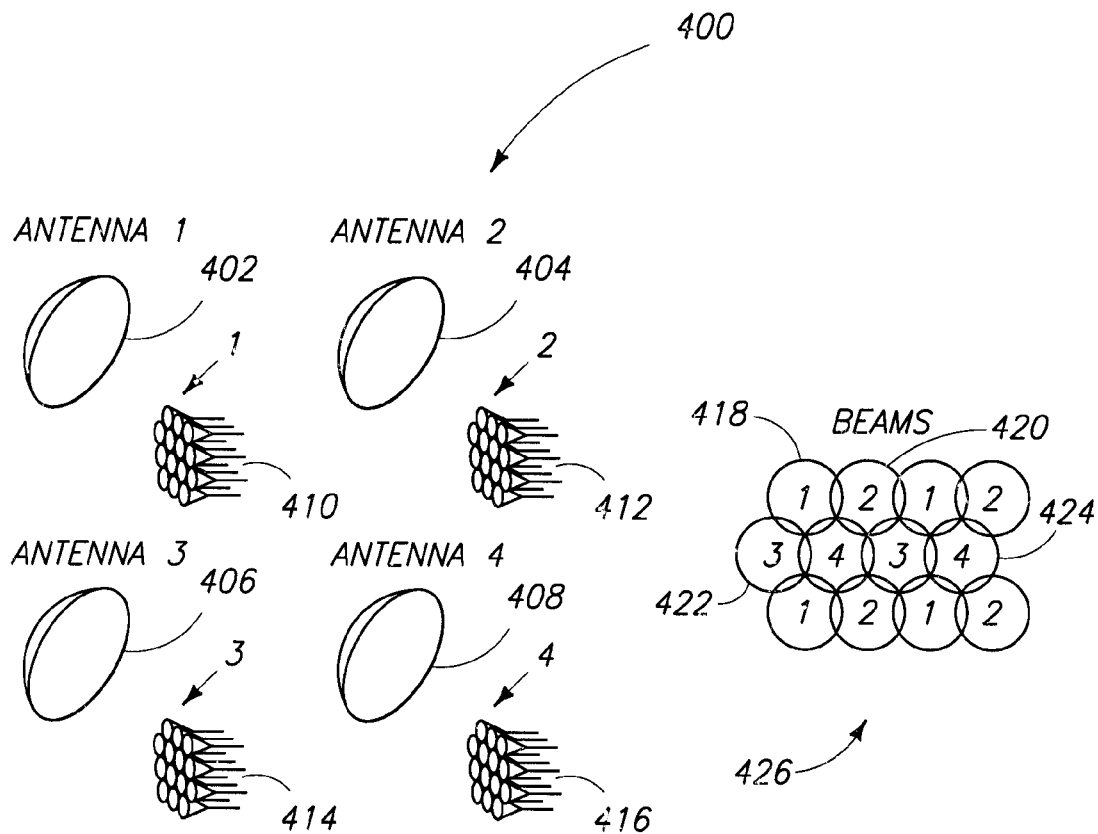

FIG. 4 illustrates a multiple aperture antenna system that generates a spot beam coverage pattern as shown in FIG. 2. System 400 comprises reflectors 402–408 and feed horn banks 410–416. Each reflector 402–408 has a dedicated feed horn bank 410–416; i.e., reflector 402 is only illuminated by feed horn bank 410, reflector 404 is only illuminated by feed horn bank 412, reflector 406 is only illuminated by feed horn bank 414, and reflector 408 is only illuminated by feed horn bank 416.

Each reflector 402–408 and the associated feed horn bank 410–416 generates a spot beam 418–424 for the beam pattern 426. For example, reflector 402 and associated feed bank 410 generate spot beam 418, reflector 404 and associated feed bank 412 generate spot beam 420, reflector 406 and associated feed bank 414 generate spot beam 422, and reflector 408 and associated feed bank 416 generate spot beam 424. As such, adjacent beams in beam pattern 426 are generated from alternate reflectors (apertures) 402–408. Hence, a larger feed horn can be used within feed horn banks 410–416 to generate each of the beams 418–424, which allows for better spillover and gain performance of system 400. Further, since system 400 uses a single feed horn bank 410–416 per beam 418–424, no Beam Forming Network (BFN) is required for system 400. However, system 400 requires multiple apertures (reflectors) 402–408 to generate beam pattern 426.

Figure 5:
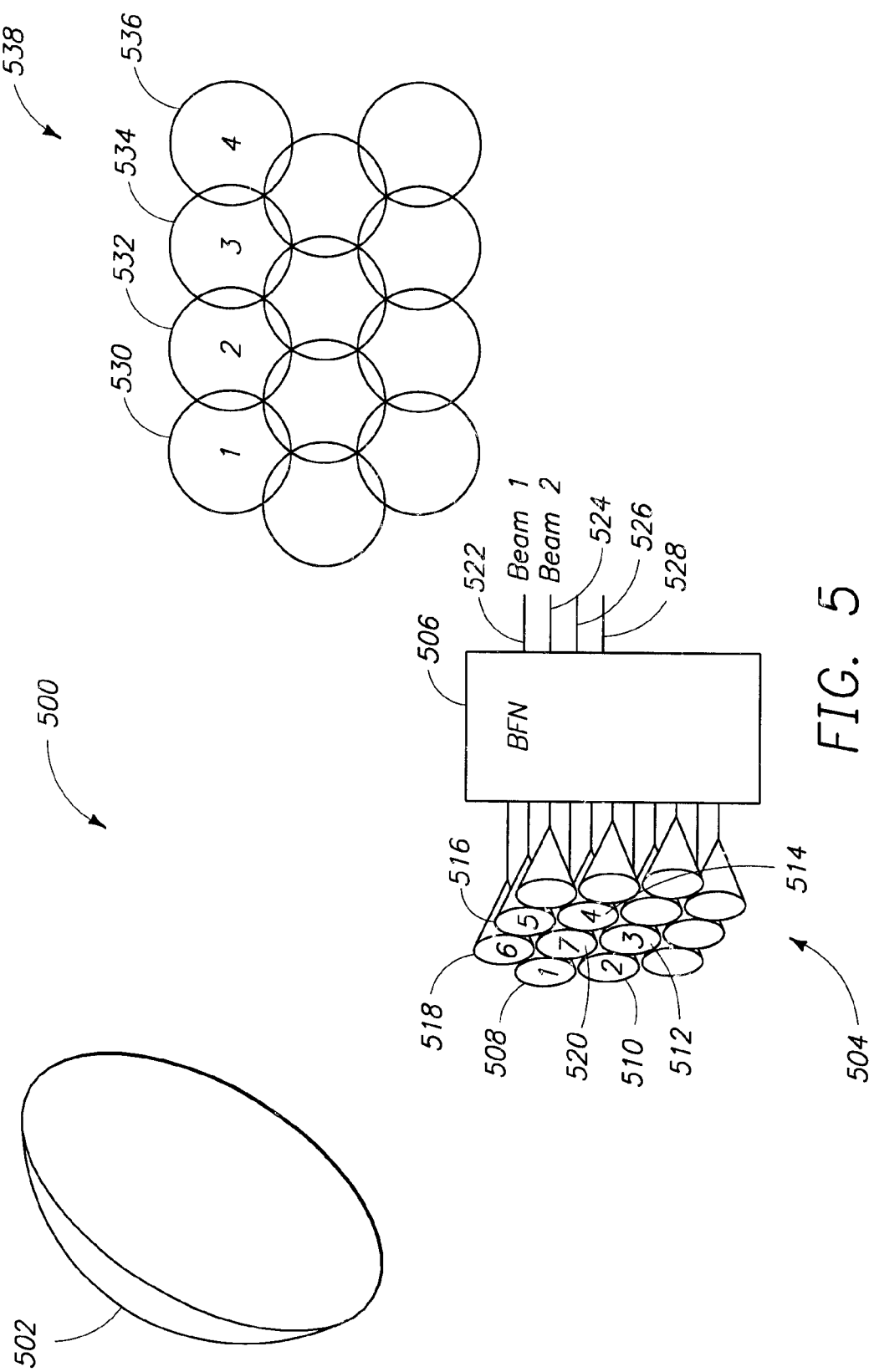

FIG. 5 illustrates a single aperture system 500 that uses a BFN to generate the beam pattern shown in FIG. 2. System 500 comprises reflector 502, feed horn bank 504, and BFN 506. The feed horn bank comprises feed horns 508–520. For each beam input 522–528 to the BFN 506, a subset of the feed horns 508–520 in feed horn bank 504 is used to generate each of the beams 530–536 in beam pattern 538. For example, feed horns 508–520 are used when beam 1 input 522 is activated to generate beam 1 530. A different set of feed horns in feed horn bank 504 can be used to generate the other spot beams 532–536 in beam pattern 538.

The advantage of this approach is that all of the spot beams 530–536 in beam pattern 538 are generated from a single aperture. The antenna geometry of system 500 is typically a single offset reflector as shown in FIG. 5, and each spot beam 530–536 is generated by a cluster of feed horns 508–520, typically a combination of 7 feed horns 508–520 or a combination of 19 feed horns 508–520, for each spot beam 530–536.

Each of the feed horns 508 in the cluster of feed horns 508–520 is excited according to an optimum excitation amplitude value and an optimum excitation phase value to obtain the best gain and scan performance for system 500. The cluster of feed horns 508–520 simulates a larger single feed horn, resulting in better spillover and gain performance. The subset of excited feed horns 508–520 includes a primary feed horn (e.g. horn 520) and a plurality of secondary feed horns (e.g. horns 508–518). In system 500, adjacent beams, e.g., beam 530 and beam 532, need to share feed horns 508–520. In a design using a 7 feed horn cluster, e.g., feed horns 508–520, each feed horn 508–520 can be shared by up to 7 beams 530–536. The disadvantage of this approach is the complexity associated with the BFN 506, which is necessary to produce the amplitude and phase excitations for all the beams 530–536. In a typical reflector antenna system 500, the optimum excitations for the different spot beams 530–536 are typically different, since the component beams generated from each feed horn 508–520 in the feed horn bank 504 vary as a function of the scan angle. This is shown in columns 1002–1008 of FIG. 10 discussed later in this disclosure. This leads to additional complexity in the BFN 506 since many different designs of the components, e.g., couplers, phase shifters, etc. within the BFN 506 have to be created.

Overview of the Present Invention

The present invention describes an antenna system using a simplified BFN, which will give uniform performance over a wide scan angle with identical cluster excitations for all the spot beams, independent of the scan angle, thus simplifying the BFN design. The antenna system comprises a dual reflector system such as a Side-Fed Offset Cassegrain (SFOC) system, which is illuminated by a feed horn array, controlled by a relatively simple BFN. In many applications, the present invention reduces the complexity of the BFN to providing only amplitude variations to the feed horn array without using phase variations, which further simplifies the BFN of the present invention.

Conventional multi-beam antennas that use BFNs require a unique design for the BFN, and, within the unique BFN, unique component designs to account for scan angle differences and other geometry and spot beam size differences for a given satellite. These unique component and BFN designs require not only additional complex circuitry during the fabrication process, they require additional testing to determine if the design is properly functioning. The present invention standardizes the BFN design, and reduces the number of unique circuit and component designs over the related art. Further, the present invention, in many applications, provides optimal spot beam performance without any phase-variation circuitry, relying solely on amplitude variation to generate the spot beams. Conventional antenna systems such as a single offset reflector or a Gregorian antenna, without the present invention, would typically require a more complex BFN to generate the required varying amplitude and phase excitations of the feed horn cluster as a function of the scan angle.

Figure 6:
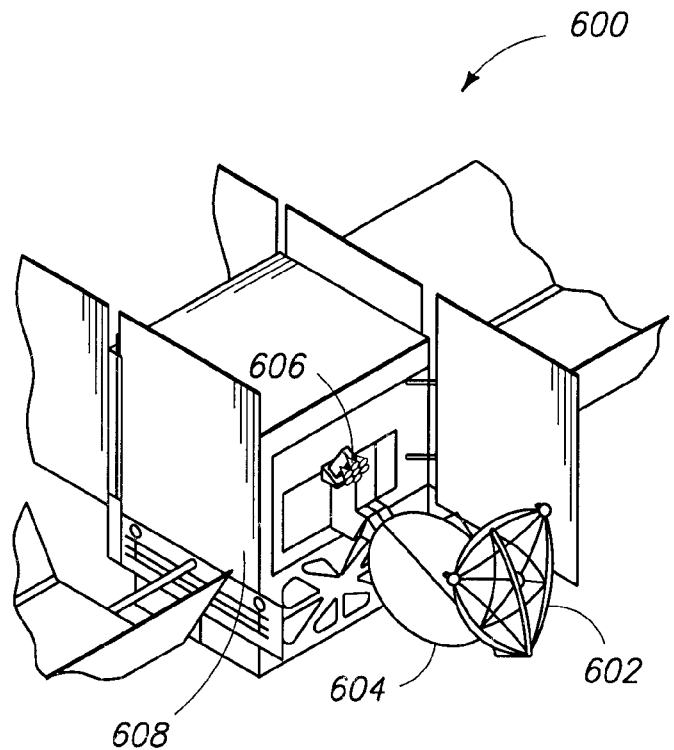
FIG. 6 illustrates an isometric view of the SFOC geometry of the present invention.

FIG. 6 illustrates an isometric view of the SFOC geometry of the present invention.

System 600 illustrates subreflector 602 and main reflector 604 being illuminated by feed horn array 606, mounted on the East face of spacecraft 608. The diameters of the main reflector 604 and the subreflector 602 are approximately 61 inches, but can be larger or smaller without departing from the scope of the present invention. At an operating frequency of 30 GHz, these diameters correspond to an antenna half-power beamwidth of 0.5 deg.

Figure 7:
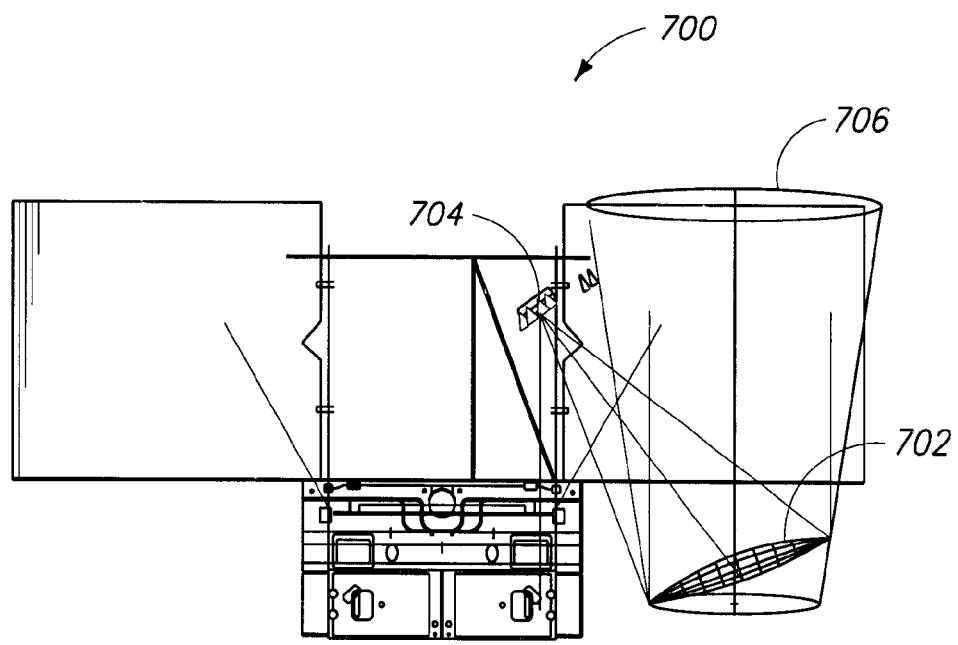
FIG. 7 illustrates a side view of a conventional single offset antenna geometry.

FIG. 7 illustrates a side view of a conventional single offset antenna geometry. System 700 comprises a single reflector 702, illuminated by feed horn array 704 to generate beam 706.

Figure 8:
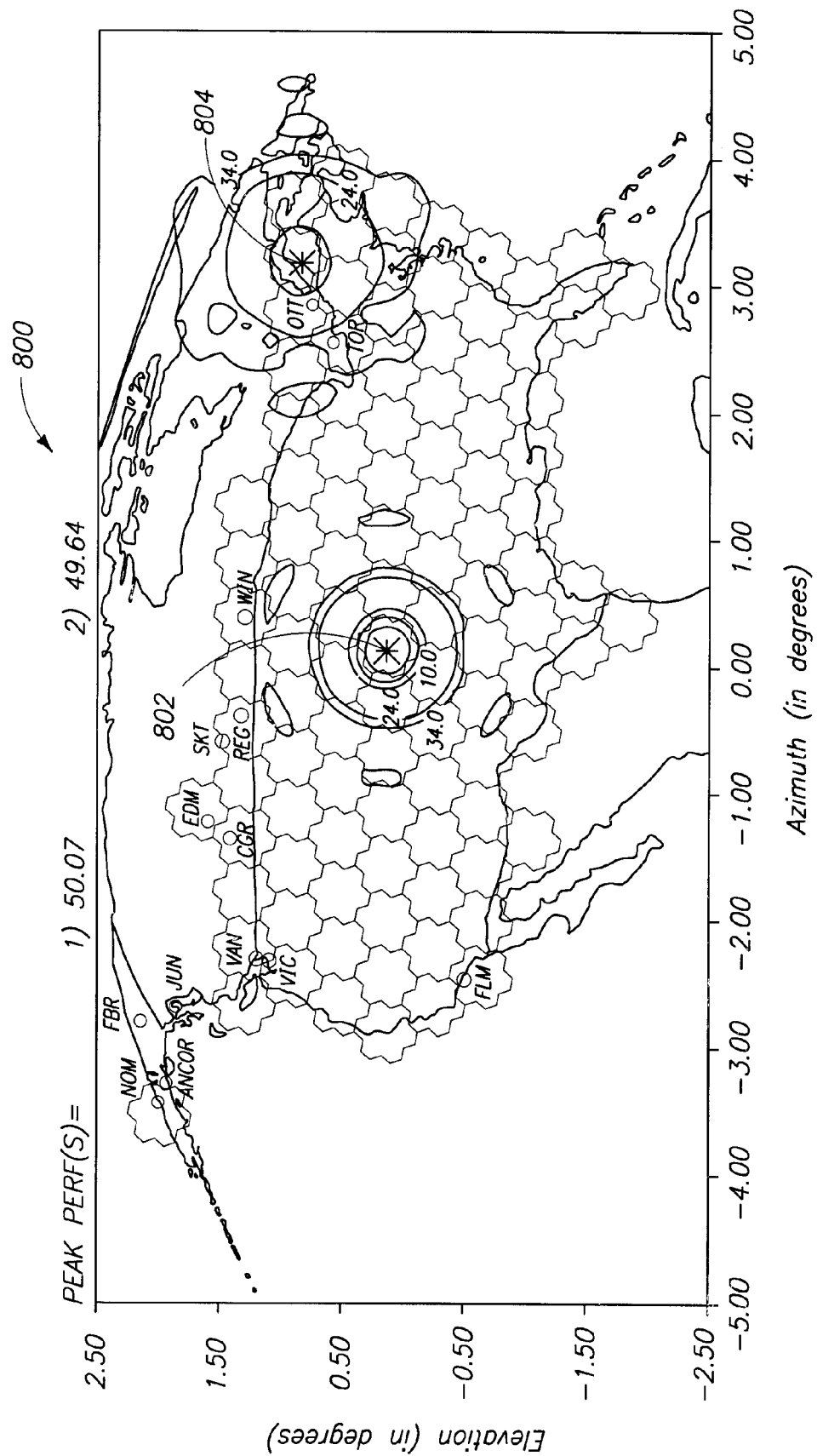
FIG. 8 illustrates the scan performance for the system illustrated in FIG. 7.

FIG. 8 illustrates the scan performance of the system illustrated in FIG. 7.

The scan performance 800, with peak performance at point 802 of 50.07 dB and point 804 of 49.64 dB, was obtained using a 7 feed horn approach to illuminate the reflector 702. The performance 800 used optimum excitations in both amplitude and phase for each beam position.

Figure 9:
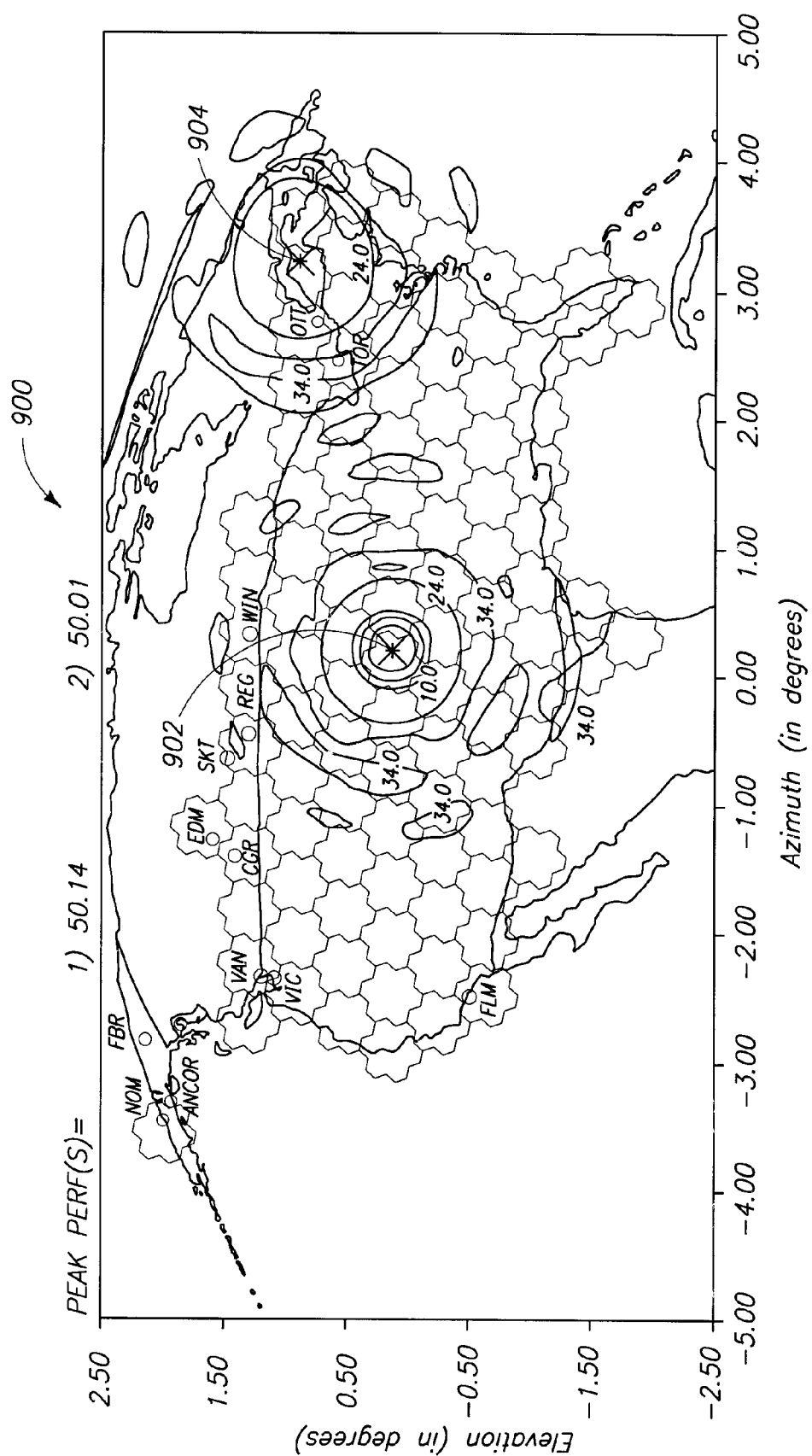
FIG. 9 illustrates the scan performance for the system illustrated in FIG. 6.

FIG. 9 illustrates the scan performance for the system illustrated in FIG. 6.

Scan performance 900, with peak performance at point 902 of 50.14 dB and point 804 of 50.01 dB, was obtained using a 7 feed horn approach to illuminate the reflectors 602 and 604. The scan performances 800 and 900 for the beams are comparable in terms of coverage gain. However, the scan loss is less in scan performance 900, which demonstrates the superior performance of the present invention. Further, the simplified BFN used to generate scan performance 900 makes the BFN and associated system of the present invention even more attractive, since it is easier to build and test than a fully optimized single offset reflector system with a complex BFN as described with respect to FIGS. 5 and 7.

Another advantage of using the geometry of FIG. 6, e.g., a SFOC geometry with a simplified BFN, is that the geometry of the present invention allows the same set of feed excitations to generate all the beams with smaller performance degradation characteristics. The single offset configuration of FIG. 7 requires a different set of feed horn excitations, e.g., different outputs from the BFN, to generate each of the different beams.

A direct comparison between the SFOC and a single offset configuration, for both focal beams and scanned beams, shows that the SFOC configuration meets or exceeds the performance of the single offset configuration. For a focal beam, the SFOC configuration has an edge of beam at 46.1 dBi, which is the same as the single offset configuration. The sidelobe levels to the nearest neighbor beam is −28 dBr for the SFOC, and −31 dBr for the single offset configuration. For scanned beams, the SFOC configuration has an edge of beam at 46.0 dBi, whereas the single offset configuration has an edge of beam at 45.6 dBi. The sidelobe levels to the nearest neighbor beam is −26 dBr for the SFOC, which is the same for the single offset configuration.

FIG. 10 illustrates the feed excitations required for the SFOC and single offset beamforming networks to generate the focal and scanned beams.

Chart 1000 illustrates the feed excitations required to generate any single beam for the beam pattern shown in FIG. 2. In the single offset configuration of FIG. 7, in order to form any one beam, the beamforming network needs a total of fifteen unique coupler designs to give the appropriate excitations to the seven feeds to form that beam. For example, to generate a focal beam in a single offset configuration, column 1002 and column 1006 illustrate that there are fourteen unique feed excitations (seven in amplitude and seven in phase) for a seven feed horn configuration, plus an additional coupler to couple all of the feed horns together. Thus, a total of fifteen unique coupler designs are required to generate the necessary feed excitations. The same situation also applies to the scanned beams. A different set of fifteen coupler designs are required to form the scanned beams, as the required feed excitations change, as shown in columns 1004 and 1006.

In the single offset reflector design, since each beam would need a different set of feed excitations, the BFN would require 15 couplers times the number of beams to generate the beams. As an example, if 100 beams need to be formed, single offset geometry would require approximately 1500 different unique coupler designs.

For the SFOC geometry, these 15 couplers take on only four different coupler values, as shown in columns 1010 and 1012. This occurs because the outer six feed elements use the same feed horn excitations, e.g., 0.03 watts. In other words, it would require only four unique coupler designs to build up the entire BFN for any number of beams since the same set of feed excitations can be applied to all the beams. Further, since there are no phase shifters required, as shown in columns 1014 and 1016, the BFN of the present invention is dramatically simplified over previous BFN designs.

To compare the BFN of the present invention with the BFN of the related art, if 100 beams were required, the BFN of the related art would require approximately 1500 unique coupler designs, whereas the BFN of the present invention would only require four unique coupler designs. Such a generic approach using the present invention results in cost reductions and faster construction times without sacrificing quality of the spacecraft.

Process Chart

Figure 11:
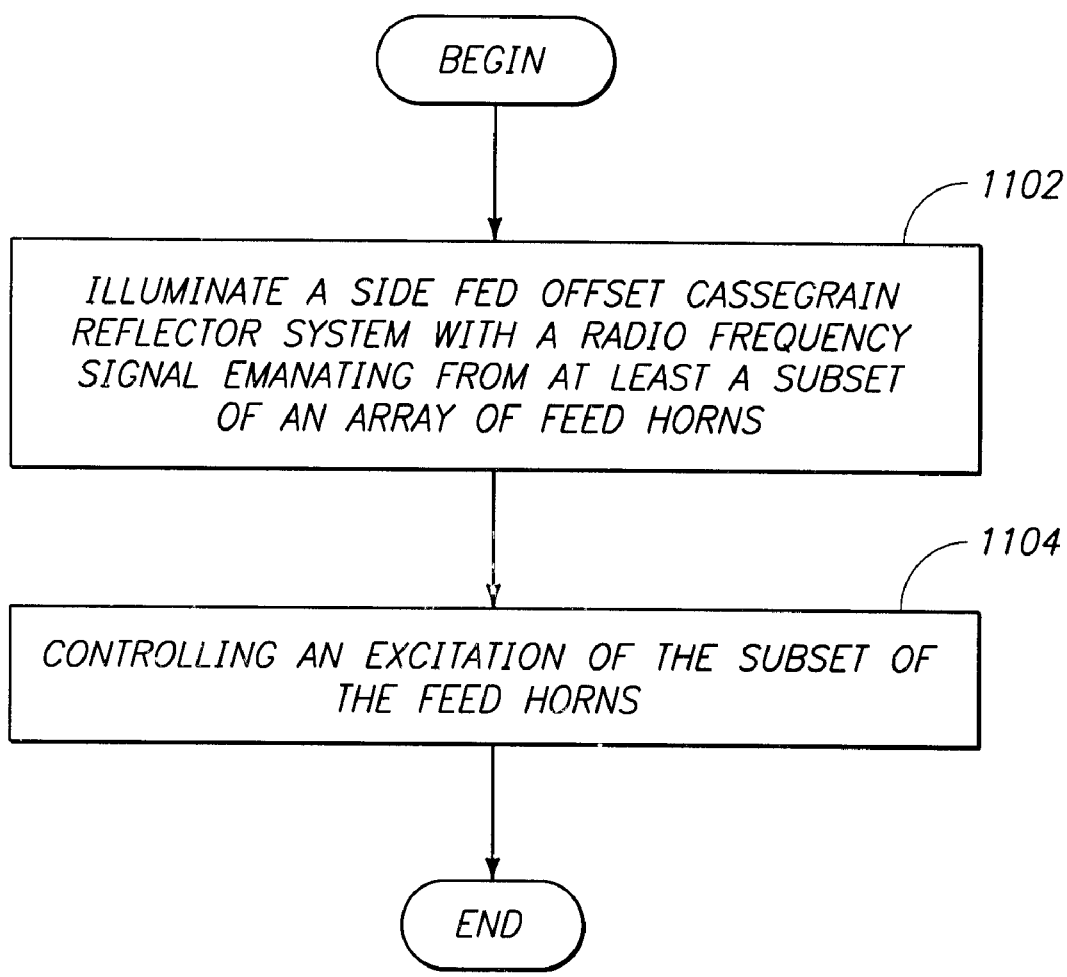
FIG. 11 is a flow chart illustrating the steps used to practice the present invention.

FIG. 11 is a flow chart illustrating the steps used to practice the present invention.

Block 1100 illustrates performing the step of illuminating a side fed offset Cassegrain reflector system with an RF signal emanating from at least a subset of an array of feed horns. Block 1102 illustrates performing the step of controlling an excitation of the subset of feed horns.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A contiguous spot beam generating system, comprising:
    a reflector system configured in a side-fed offset Cassegrain (SFOC) configuration;
    an array of feed horns comprising at least a subset of feed horns for illuminating the reflector system; and
    a beamforming network, communicatively coupled to the array of feed horns, for controlling an excitation of the subset of the feed horns in the array of feed horns.

2. The system of claim 1, wherein the subset of feed horns include a primary feed horn and a plurality of secondary feed horns.

3. The system of claim 2, wherein the beamforming network controls the excitation of the subset of feed horns such that each of the secondary feed horns is characterized by a substantially constant secondary excitation amplitude value.

4. The system of claim 3, wherein the beamforming network controls the excitation of the subset of feed horns such that each of the secondary feed horns is characterized by a substantially constant secondary excitation phase value.

5. The system of claim 4, wherein the secondary excitation phase value is approximately zero.

6. The system of claim 3, wherein the beamforming network controls the excitation of the secondary feed horns such that each of the secondary feed horns is characterized by a substantially constant secondary excitation amplitude value and a substantially constant secondary phase value when the spot beam is scanned.

7. The system of claim 6, wherein the beamforming network controls the excitation of the primary feed horns such that each of the primary feed horns is characterized by a substantially constant primary excitation amplitude value when the spot beam is scanned.

8. The system of claim 7, wherein the beamforming network controls the excitation of the primary feed horns such that each of the primary feed horns is characterized by a substantially constant excitation phase value when the spot beam is scanned.

9. The system of claim 8, wherein the beamforming network controls the primary feed horns to a substantially constant excitation amplitude value of approximately 0.82 and a substantially constant excitation phase value of approximately 0.0 and the secondary feed horns to a substantially constant excitation amplitude value of approximately 0.03 and a substantially constant excitation phase value of 0.0 when the spot beam is scanned.

10. The system of claim 2, wherein each of the plurality of secondary feed horns are adjacent the primary feed horn.

11. A method of generating a desired contiguous spot beam radiation pattern, comprising:
    illuminating a side-fed offset Cassegrain reflector system with a radio frequency (RF) signal emanating from at least a subset of an array of feed horns; and
    controlling an excitation of the subset of the feed horns.

12. The system of claim 11, wherein the subset of feed horns include a primary feed horn and a plurality of secondary feed horns.

13. The method of claim 12, wherein beamforming network controls the excitation of the subset of feed horns such that each of the secondary feed horns is characterized by a substantially constant secondary excitation amplitude value.

14. The method of claim 13, wherein the excitation of the subset of feed horns is controlled such that each of the secondary feed horns is characterized by a substantially constant secondary excitation phase value.

15. The method of claim 14, wherein the secondary excitation phase value is approximately zero.

16. The method of claim 13, wherein the excitation of the secondary feed horns is controlled such that each of the secondary feed horns is characterized by a substantially constant secondary excitation amplitude value and a substantially constant secondary phase value when the spot beam is scanned.

17. The method of claim 16, wherein the excitation of the primary feed horns is controlled such that each of the primary feed horns is characterized by a substantially constant primary excitation amplitude value when the spot beam is scanned.

18. The method of claim 17, wherein the excitation of the primary feed horns is controlled such that each of the primary feed horns is characterized by a substantially constant excitation phase value when the spot beam is scanned.

19. The method of claim 18, wherein the primary feed horns are controlled to a substantially constant excitation amplitude value of approximately 0.82 and a substantially constant excitation phase value of approximately 0.0 and the secondary feed horns are controlled to a substantially constant excitation amplitude value of approximately 0.03 and a substantially constant excitation phase value of 0.0 when the spot beam is scanned.

20. The method of claim 12, wherein each of the plurality of secondary feed horns are adjacent the primary feed horn.

21. A signal, generated by:
   illuminating a side fed offset Cassegrain reflector system with a radio frequency (RF) signal emanating from at least a subset of an array of feed horns; and
   controlling an excitation of the subset of the feed horns.

* * * * *